US 7,197,463 B2

(12) United States Patent
Kotzin (10) Patent No.: US 7,197,463 B2
(45) Date of Patent: Mar. 27, 2007

(54) METHOD AND APPARATUS FOR PROVIDING SECURE ASSISTANCE TO A COMMUNICATIONS UNIT OVER A NETWORK

(75) Inventor: Michael D. Kotzin, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 866 days.

(21) Appl. No.: 10/608,991

(22) Filed: Jun. 27, 2003

(65) Prior Publication Data

US 2005/0010815 A1    Jan. 13, 2005

(51) Int. Cl.
*G10L 21/00* (2006.01)
(52) U.S. Cl. ........................ 704/275; 379/80; 379/88.18
(58) Field of Classification Search ................ 704/275; 379/80, 88.18
See application file for complete search history.

(56) References Cited

U.S. PATENT DOCUMENTS 5,307,271 A * 4/1994 Everett et al. ................ 701/24
6,950,441 B1 * 9/2005 Kaczmarczyk et al. ..... 370/467
6,976,174 B2 * 12/2005 Terrell et al. ................ 726/22
7,080,381 B2 * 7/2006 Hannigan et al. .......... 719/313

* cited by examiner

Primary Examiner—Abdul K. Azad
(74) Attorney, Agent, or Firm—Charles W. Bethards (57) ABSTRACT

A method (300) of and secure server (200) for providing secure assistance with control of a communications unit (101, 103, 105) is disclosed. The method includes receiving (303) an instruction message via a network that corresponds to voiced instructions from the communications unit; parsing (307) the voiced instructions and sending (409) the results to assistant agents having limited access to sensitive information or only partial access to the instructions maintains security of sensitive information. The assistant agents convert (411) the portions of voiced instructions to commands; and the commands are assimilated (415) in a secure server along with other information to provide a control message corresponding to the commands. The control message is sent to the communications unit, thereby securely assisting with the control of the communications unit.

31 Claims, 3 Drawing Sheets

METHOD AND APPARATUS FOR PROVIDING SECURE ASSISTANCE TO A COMMUNICATIONS UNIT OVER A NETWORK

RELATED APPLICATIONS

The present application is related to co-pending applications designated with Ser. Nos. 10/608,989 and 10/608,593 by Kotzin having a like filing date and the same assignee. application Ser. No. 10/608,989 is titled METHOD AND APPARATUS FOR PROVIDING ASSISTANCE TO A COMMUNICATIONS UNIT OVER A NETWORK. Ser. No. 10/608,593 is titled METHOD AND APPARATUS FOR CONTROLLING AN ELECTRONIC DEVICE. Each of these applications is hereby incorporated in this application by reference.

FIELD OF THE INVENTION

This invention relates in general to electronic devices such as communications units, and more specifically to a method and apparatus for providing assistance to such units over a network.

BACKGROUND OF THE INVENTION

Electronic devices such as communications units or subscriber devices providing data and voice services for user operating in corresponding systems are known. Operating these devices or units by interacting with a keypad or keyboard and display can be challenging when the user is otherwise preoccupied. It is known to include voice recognition systems to assist with controlling these devices for some purposes, however voice recognition systems are often marginal, suffer in high ambient noise environments, and can be a burden if the recognition system needs to be trained.

Controlling electronic devices or communications units from applications, for example, has been contemplated but such control has been limited to APIs (application program interfaces) where the interface details are defined according to the API. It is known to download software including applications to communication units as well as to configure the units. With these approaches there is a security risk and thus only highly trusted sources can have access to the unit. Clearly a need exists for methods and apparatus for securely providing assistance to a communications unit and preferably this assistance would be widely available over for example a network.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

DETAILED DESCRIPTION OF PREFERRED EMBODIMENTS

In overview, the present disclosure concerns methods and apparatus for securely controlling and providing assistance with controlling electronic devices such as communications units. This control or assistance may be provided from secure remote agents or indirectly from assistant agents through the remote agent where these agents are available via a network to communications units that for example, have some sort of service relationship with the remote agent. The assistant agents are public individuals that provide the assistance but using the principles and concepts disclosed and discussed here maintains the security of information for the communications unit that may be sensitive. These wireless communications or communications units are often referred to as subscriber devices, such as cellular phones or two-way radios or messaging devices and the like. More particularly various inventive concepts and principles embodied in systems, servers, and methods therein for providing, initiating, or facilitating secure control or assistance of the communications unit are discussed and described. Note that the devices or units can be a variety of devices, such as a personal digital assistant, personal assignment pads, and personal computers equipped for wireless operation, a cellular handset or device, or equivalents thereof provided such units are arranged and constructed to interface with the servers and systems arranged and operating in accordance with the principles and concepts described and discussed.

The principles and concepts discussed and described may be particularly applicable to systems and servers or agents that are networked via the Internet or world wide web and arranged and constructed for packet data communications including voice over IP (VoIP) with communications units. These units provide or facilitate voice communications services or data or messaging services over wireless wide area networks (radio WANs), such as conventional two way systems and devices, various cellular phone systems including analog and digital cellular, CDMA (code division multiple access) and variants thereof, GSM, GPRS (General Packet Radio System), 2.5 G and 3G systems such as UMTS (Universal Mobile Telecommunication Service) systems, integrated digital enhanced networks (iDEN™) and variants or evolutions thereof. Furthermore the wireless communications units or devices can have short range communications capability normally referred to as W-LAN capabilities, such as IEEE 802.11, Bluetooth, or Hiper-LAN and the like that preferably utilize CDMA, frequency hopping, OFDM, or TDMA access technologies and one or more of various networking protocols, such as TCP/IP (Transmission Control Protocol/Internet Protocol), IPX/SPX (Inter-Packet Exchange/Sequential Packet Exchange), Net BIOS (Network Basic Input Output System) or other protocol structures.

As further discussed below various inventive principles and combinations thereof are advantageously employed to receive a request for assistance with a voice message that is converted to control commands with the commands being used to effect assistance with control of the unit in a secure manner. Control of the device or unit may be implemented by sending the controlling entity for a unit a message corresponding to normal keypad data. In this manner a remote secure agent can advantageously be tasked with converting voiced commands to control commands, such as keypad data, to assist with those activities that may detract from other duties, such as driving a vehicle and control of a device or unit can be effected with minimal risk of misuse provided these principles or equivalents thereof are utilized.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

Figure 1:
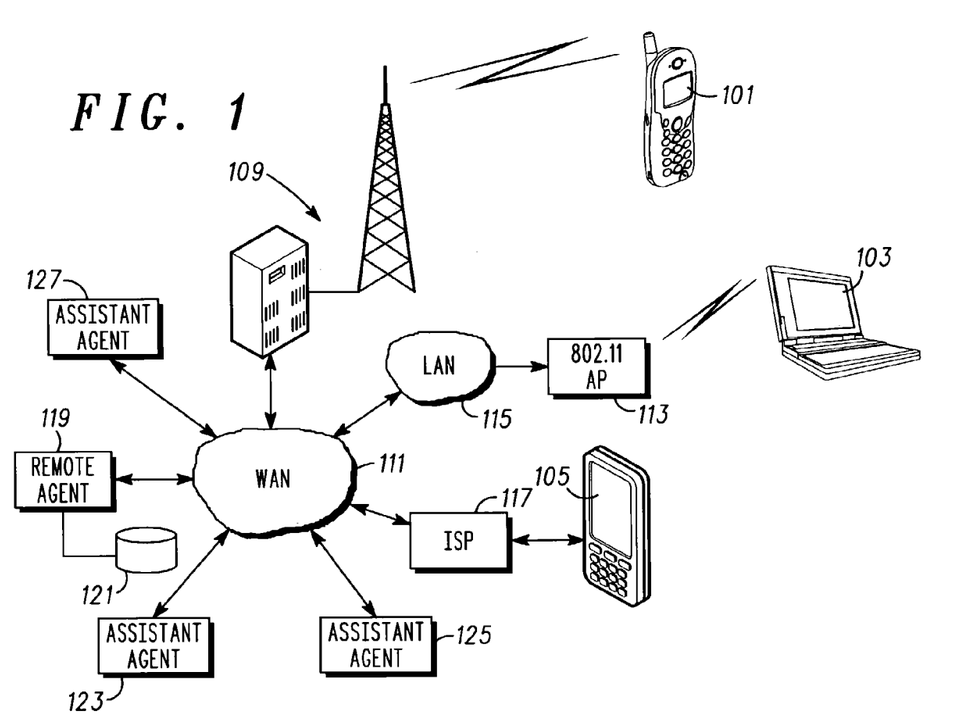
FIG. 1 depicts, in a simplified and representative form, a system that is suitable for providing secure assistance to communications units.

Referring to FIG. 1, a simplified and representative diagram of a system that is suitable for securely providing assistance to communications units and suitable for implementing methods of controlling and assisting the devices or units will be discussed and described. FIG. 1 shows wireless communications units 101, 103 and a wired communications unit 105. These units include a cellular handset 101 coupled via radio signals to a wide area radio access network 109 (radio WAN 109), such as a mobile phone or cellular system. Further included or depicted is a personal computer 103, such as a laptop or tablet computer that is shown coupled via radio signals to a W-LAN access network or access point 113 and further to LAN 115 (W-LAN 115). The W-LAN 115 is preferably based on IEEE 802.11 with corresponding access points but may also be a Bluetooth or other short range wireless LAN. Additionally a personal digital assistant 105 or the like is depicted as coupled, via for example a wired LAN or WAN, to an ISP 117 (Internet Service Provider).

The radio access network or radio WAN 109, LAN 115, and ISP 117 are coupled to a WAN, such as the Internet or World Wide Web or the like. In this manner each of the devices or communications units 101, 103, 105 are able to contact and be coupled to various servers, including an entity designated as remote agent 119. The remote agent 119 is coupled to a memory 121, such as a magnetic disk drive. Further shown are a plurality of assistant agents 123, 125, 127 that can be selected to assist the remote agent with providing secure assistance to the communications units on an as needed basis. These wired networks and wireless networks can serve a multiplicity of devices or units. Generally the networks, including wireless networks or W-LAN 115, and radio WAN 109 systems and the Internet are known to one of ordinary skill and will not be further described in any detail, apart from any necessities with respect to the preferred embodiments. The communications units 101, 103, 105 are also generally known other than the modifications and improvements disclosed herein.

The remote agent and assistant agents are known servers or work stations, such as those available from manufacturers, such as Hewlett Packard, Dell and the like and may include an individual to facilitate some functionality. The assistant agents are public individuals using ordinary work stations or personal computers and appropriate software to provide assistance as requested by the secure server or remote agent. The secure server will be running or executing software or a software package or instructions to provide the inventive functionality, specifically secure assistance to communications units, as described and discussed herein. Given the known functions and structure of such servers and networks and units they will not be described in detail other than as related to the inventive principles and concepts disclosed and discussed below.

Figure 2:
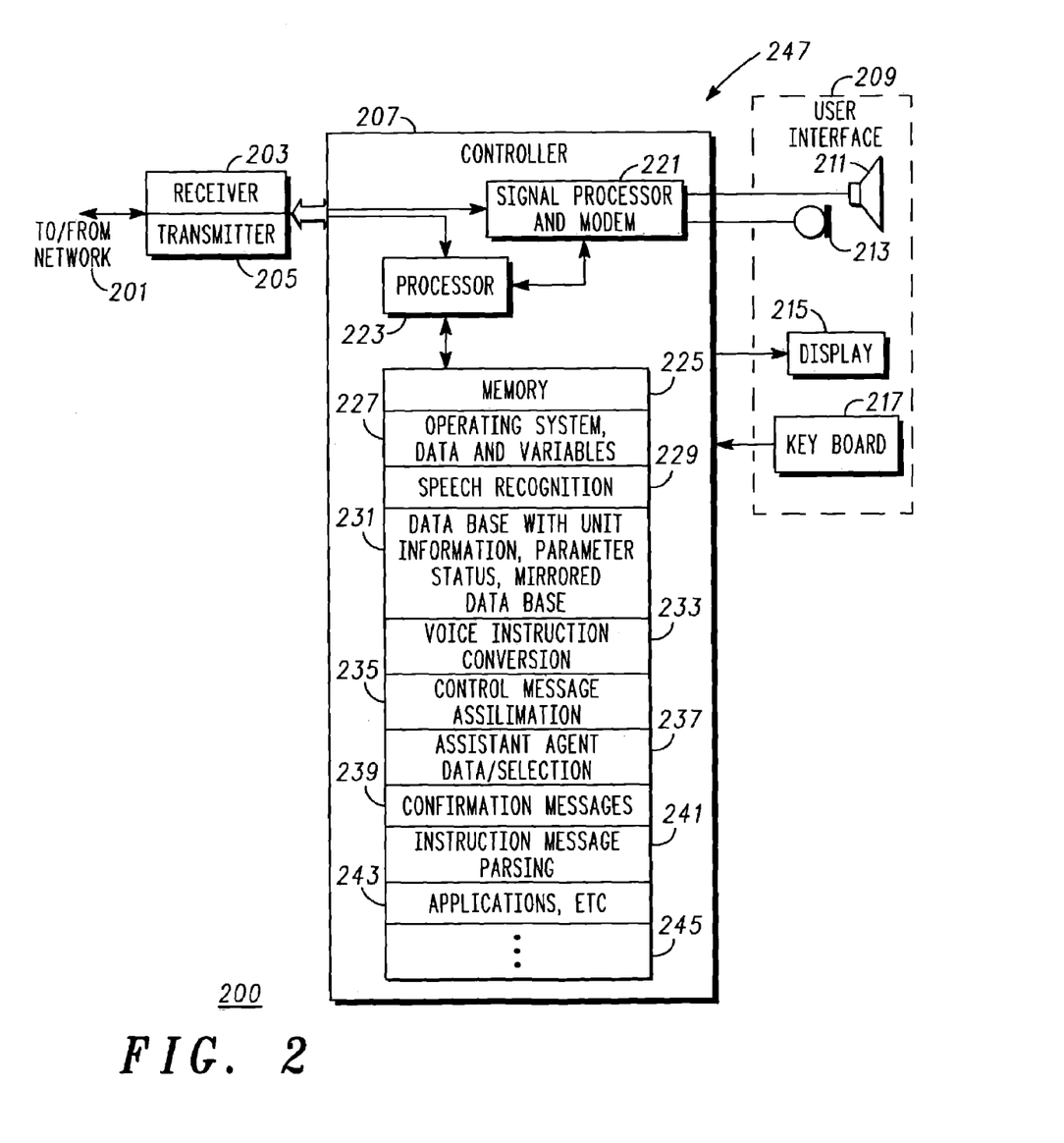
FIG. 2 depicts a block diagram of a preferred embodiment of a server that is arranged to securely assist with control of a communications unit.

Referring to FIG. 2 a block diagram of a preferred embodiment of a server or secure server 200, such as the remote agent 119 will be discussed and described. The server is arranged, constructed, and operational to assist with control of a plurality of communications units in a secure manner such that sensitive information, such as phone books and user identities associated with any of the communications units, will not be available or available in a form that is useful to any of the assistant agents 123–127 when their services are utilized. Note that the specific functionality of portions, functional blocks or elements of the server can depend on the particular manufacturer and other conventions used by the network providers. These specifics of transmission and reception and relevant processing are known and therefore any further discussions will be in generalities that are applicable to typical servers and networks.

The secure server is coupled to and from a network 201, such as the WAN 111, via a connection such as an Ethernet based connection using a normal wired connection such as an RJ 45 connector. Signals comprising packetized data from the network are coupled to and received by a receiver 203 or transmitted or sent from a transmitter 205 to the network as is known. The receiver 203 and transmitter 205 may be operational in a WAN network such as the Internet, in a typical wired network such as an Ethernet environment or the like. The receiver 203 provides a signal that is coupled to a controller 207 for further processing, such as call and audio or message processing. The transmitter 205 is also coupled to the controller 207 and the controller 207 operates to generate messages and so on, as known, to prepare signals for amplification and transmission by the transmitter 205 via the network.

The controller 207 is coupled to a user interface 209 that is typical for a computer or server based environment and that includes, for example, audio transducers, such as an earpiece or speaker 211 and microphone 213, monitor or display 215, keyboard 217, mouse (not specifically depicted) and the like. The transmitter 205, receiver 203, and user interface 209 are each inter-coupled, as depicted, to the controller 207 and the controller 207 provides overall operational command and control for the server. The controller 207 is coupled to and operates together with the audio transducers, display and keyboard or set of keys to effect a portion of a user interface experience that may depend on the particular device and its features and to facilitate generation and consumption of messages or other information. The elements and functionality of the user interface are known and widely available.

The controller 207 includes a signal processor/modem 221, typically digital signal processor based that is used for generating signals to be provided to the transmitter as well as processing signals from the receiver. The signal processor 221 functionally includes known and appropriate A/D and D/A convertors, an audio vocoder, channel coders and decoders, a modem, and other known functions. For example audio from the microphone 213 is processed through an A/D convertor and then the vocoder to provide audio frames. These frames may be combined or sequenced with other control information, data, and the like, channel coded, packetized (consistent with known VoIP schemes) and then used to modulate, via the modem, a signal that can be the carrier signal that is subsequently amplified by the transmitter. The signal processor also works essentially in reverse to demodulate signals from the receiver and provide messages or data for further processing by the controller, including for example applying voice packets or VoIP packets to a vocoder with an output coupled to a D/A convertor that is used to drive the earpiece or speaker 211. The controller further includes a processor 223 that is, preferably, a known microprocessor based element that is widely available and can include one or more microprocessors and one or more digital signal processors depending on the precise responsibilities of the controller 207 with respect to signaling duties and call processing that are not here relevant.

In any event the processor 223 is also coupled to a memory 225 that can be, for example, a combination of known RAM (Random Access Memory), ROM (Read-Only Memory), EEPROM (Electrically Erasable Programmable ROM) or magnetic memory that among other items, such as messages and folders with messages, address books, standard or canned messages, and various operating variables and parameters will store an operating system or software and various operating variables and parameters 227 for execution and use by the processor 223. This memory can include the memory 121 or portion thereof. This operating software when executed by the processor 223 will result in the processor 223 performing the requisite functions of the server such as interfacing with and controlling the transceiver or transmitter 205, receiver 203, signal processor/modem 221 and user interface 209 including display and keyboard, audio processing functions and so on including other functional elements not depicted and software routines that will be further described below.

The memory 225 further includes message processing routines not specifically shown for supporting packet based voice and data messages that will be appreciated by one of ordinary skill and that can vary depending on network specifics. As depicted, the memory 225 further includes space for a speech recognition program 229. Further included in the memory are databases 231 including communication unit specific information, unit parameter status and a mirrored database including for example, one or more of a phone book, address book and the like for each communications unit that the server provides assistance to, voice instruction conversion routines 233 (can be part of an application for providing assistance depending on software architecture), a control message assimilation routine 235 corresponding to the various features and functions of specific communications units, such as dialing or looking up a number, etc. and functionality for receiving commands and other information from one or more assistant agents and assimilating those commands into control commands for one or more communications units.

Also included and further discussed below are Assistant agent data/selection routines 237, confirmation messages routines 239, instruction message parsing software 241, and applications 243, including for example software to facilitate a user interface for the secure server to facilitate providing secure assistance to communications units as well as programs for maintaining or presenting statistics concerning the assistant agents and so on. The reader or one of ordinary skill will appreciate that this listing is merely a brief listing of exemplary routines that will be required or advantageous in effecting a server or agent for providing secure assistance to communications units and other services and various command and control duties and that many others 245 including user interface drivers, etc. that can be stored in the memory have not been mentioned.

The following discussion will focus on the operational interactions and refer to the FIG. 2 depiction of the secure server 200 that can provide remote and secure assistance in an advantageous manner. The secure server 200, as noted above, is arranged and constructed to assist with control of a communications unit and this capability may be used by communications units for taking advantage of remote assistance service when desired with the assurance that information they provide will not be divulged to others in a useful fashion. The secure server 200 includes the receiver 203 to receive instruction messages that correspond to voiced instructions from one of a multitude of communications units that are qualified to utilize the assistance service. In one embodiment this instruction message uses known VoIP (voice over Internet protocol) techniques and capabilities and the signal processor 221 can be used to render audible versions of the speech using the vocoder.

In addition to the instruction message, the receiver further receives specific information sufficient to identify the communications unit, such as an address or URL, URI (uniform resource locator, identifier) or other identifying indicia that can be used as an index to appropriate portions of the database 231. From time to time the receiver will also receive messages with information to populate and maintain a database, e.g. a mirrored database as is known and that corresponds to each of the communications units. This database is stored in the memory that is part of the memory 121 also shown as 225 in FIG. 2. The database associated with the communications unit, includes one or more of unit specific information, a parameter status, such as ringer type, or the mirrored database associated with the communications unit. A confirmation message confirming receipt of the instruction message can be returned to the communications unit using routines 239.

The mirrored database includes, for example, items that can stored in the communications unit that may change from time to time, such as phone books, address books, and the like. The mirrored database in one aspect can be segmented or sectioned into secure information and information that can be made available to and as required by assistant agents. It is worth noting that any database that is sufficiently segmented such that the contents of any one segment no longer poses a security risk since no one segment includes sufficient information to pose a risk. This segmentation or sectioning of the database may result is different sections where any one assistant agent could not have two adjacent portions of a record but still be provided more than one section. For example, you maynot want a given assistant agent having both first and last names or all of a phone number but it would be OK if the first name and area code were provided to one assistant agent, etc. Thus only a portion of the mirrored database stored in the memory is available to the assistant agent thereby securing the contents of the mirrored database from the assistant agent. It may be proper or OK if the portion includes only names and corresponding locations within the phone book as most of us use abbreviated names that do not provide much information to anyone else, e.g. John D.

In any event, further included is the controller 207 that is coupled to the receiver and used in one embodiment of the remote agent or secure server to, among other duties, parse the instruction message using the instruction message parsing routine 241 to provide an agent message, the agent message corresponding to at least a portion of the voiced instructions. Of course the parsing function may generate or result in a plurality of agent messages. The parsing function can be performed more or less automatically by the secure server by, for example, detecting pauses in the voiced instructions. For example if the voiced instructions were "call John Doe" the parsing function could provide three agent messages by detecting the natural pauses between the verbalized words.

Rules could be agreed upon for providing the assistant services, such as placing relatively long pauses between verbal expressions where the user of the communications device does not want a public person to have access to both expressions. Many speech recognizers, even if marginal at detecting speech can detect pauses. The parsing could be semi-automatic in that an operator at the secure server could review the parsing results. Another approach to parsing is for an operator at the secure server to manually perform the parsing while listening to the voiced instructions as rendered.

One further approach for parsing is where the controller uses parsing information included with the instruction message for parsing the instruction message to provide two or more agent messages. This is similar to the rules approach where a user of a unit leaves longer pauses to use for parsing, but rather than the pause an affirmative indication would be included in the instruction message. For example if the communication unit has an assist or PTT or PTA button to initiate the assistance service as explained in co-pending application by Kotzin titled METHOD AND APPARATUS FOR CONTROLLING AN ELECTRONIC DEVICE, this button could be activated to start capturing voiced instructions and re-activated each time the user wanted the instruction message to be parsed. The re-activation can place predetermined and agreed upon data in the packet stream and when the secure server detects this predetermined data, it will break or parse the verbalized instructions into separate portions. It is further noted that repetitive activations of the appropriate button inherently provide separate VoIP packets or messages. The secure server upon detecting repetitive instruction messages from the same communications unit could automatically treat all of the instructions as one instruction message. Note that the responsibility for maintaining security for information can vary depending on who or what has responsibility for the parsing function.

Also included is the transmitter 205 that is controlled by the controller 207 and used to forward the agent messages to one or more assistant agents after they have been selected using the routines 237 according to the techniques in the co-pending application by Kotzin titled METHOD AND APPARATUS FOR PROVIDING ASSISTANCE TO A COMMUNICATIONS UNIT OVER A NETWORK. After the forwarding, the receiver receives or obtains, responsive to the forwarding, a message from the assistant agent or each such agent having commands corresponding to and resulting from converting at the assistant agent the agent message corresponding to a portion or more of the voiced instructions. The conversion process is described in the above-identified co-pending application and uses the conversion routines 233 and possible speech recognizer 229. The conversion process includes one or more of an automated conversion technique wherein the VoIP packets are applied to a vocoder to provide speech with the speech analyzed by the speech recognition routine 229, in total or in part, or manual techniques where the speech is used to drive the speaker or earpiece 211 for operator conversion. The controller then assimilates, using the assimilation software 235, the commands from the message or each of the messages with other information to provide a control message corresponding to control commands to effect the instruction message for the specific type of communications unit; and the transmitter sends the control message to the communications unit, preferably using known packet data techniques, thereby securely assisting with the control of the communications unit.

By way of example, suppose as above the voiced instructions are "Call John Doe" where by implication John is a number in the phone book for the user. This situation may be handled in various exemplary manners and still control to perhaps varying extents, the amount of information available to an assistant agent. For example suppose the parsing function results in sending the complete "Call John Doe" message to an assistant agent and the assistant agent is not provided access to the database other than various control commands corresponding to the type of communications unit. The assistant agent would return commands including control commands corresponding to SND and a digital version of John Doe. The controller as part of the assimilation would look up in the database the location of the record for John Doe or the phone number for John Doe and provide a control message with control commands resulting in recalling the number at the indicated location and dialing the number or alternatively a control message with the number for entry and a dial command. In this instance the secure server given that the instruction message required access to a number in a phone book included in the mirrored database, obtained a message from the assistant agent that comprises a name and the controller assimilated the commands from the agent with other information and retrieved the phone number or location in the phone book corresponding to the name.

Suppose the database has been segmented such that names and an index to the database are available to an assistant agent. The agent might return a control command indicating SND or DIAL and a number in the assistant agent's index corresponding to John Doe. The controller performing the assimilation of the commands with other information could interpret the index or cross reference the index location to the corresponding location in the phone book if different and formulate one of the above discussed control messages. In this example the secure server given that the instruction message requires access to a number in the phone book stored in the memory, obtained a message from the assistant agent included one of a location and a name corresponding to the number and the controller assimilates the commands with the other information and further retrieves the number or location in the phone book.

Another alternative is where the voiced instructions are parsed into different portions, such as "Call John" and "Doe". The "Call John" can be forwarded to an assistant agent and a SND or DIAL control command returned with a digital version of John. The secure server could convert "Doe" to a digital version thereof and as part of the assimilation, combine the digital versions of John and Doe, look up the number for or location for the number of John Doe and provide one of the control messages noted above. Note that in this instance the controller parsed the instruction message to provide a first agent message and a second agent message each of the first and second agent message being, respectively, no more than a first and a second portion of the voiced instructions. These respective agent messages could be forwarded to two different assistant agents with one returning commands corresponding to Call and a digital version of John and the other a digital version of Doe with the controller left to assimilate John and Doe and look up the number for John Doe and provide an appropriate control message.

In more general terms this situation is one where the controller parses the instruction message and provides a plurality of agent messages, each indexed to the instruction message; the transmitter forwards the plurality of agent messages to a plurality of assistant agents without any one of the plurality of assistant agents getting all of the plurality of agent messages; the receiver is used to obtain a plurality of the messages with each one of the messages from a corresponding one of the plurality of assistant agents; and the controller assimilates the commands from the plurality of messages to provide the control message.

The secure server 200 using these principles and concepts can assist the communications unit by, for example, using the controller or assistant agents to convert or assist with conversion of the voiced instructions to the control commands. The control commands, when executed by the communications unit, will effect actions at the communications unit such as dialing a number, looking up a number in a phone book of the communications unit, the phone book incorporated into the mirrored database at the secure server associated with the communications unit, modifying contents of a memory of the communications unit, the modifying also performed on the mirrored database associated with the communications unit, sending a text message, or the like A portion of the secure server is a system 245 for assisting with controlling the communications unit. The system 245 can be integral to the server as depicted or an add on or accessory system with appropriate coupling between an ordinary controller for a server and the system 245. Note that also the structure of the system and constituent elements providing the requisite functionality need not be co-located. The structure, functionality and operation of such a system 245 has been described above in detail and thus need not be repeated here. However in overview and advantageously a method of securely providing a control message for a communications unit is implemented. The method comprises parsing voiced instructions from the communications unit to provide a plurality of agent messages where the agent messages correspond to at least a portion of the voiced instructions. Further included in the method is forwarding the plurality of agent messages to a plurality of assistant agents; each of the assistant agents converting a corresponding one of the plurality of the agent messages to commands and assimilating the commands resulting from the converting to provide or synthesize the control message corresponding to the voiced instructions. Note that the assimilation can be performed by the controller 207 of the system or secure server but could as well be performed at and by a controller or controlling entity that is part of the communications unit.

As noted the system or server in one aspect is a more or less known server advantageously operating according to a software program for securely assisting with control of a communications unit. The software program when loaded and executing on a processor of the server results in the server performing a method corresponding to the above described processes and procedures or the method embodiments described below.

Figure 3:
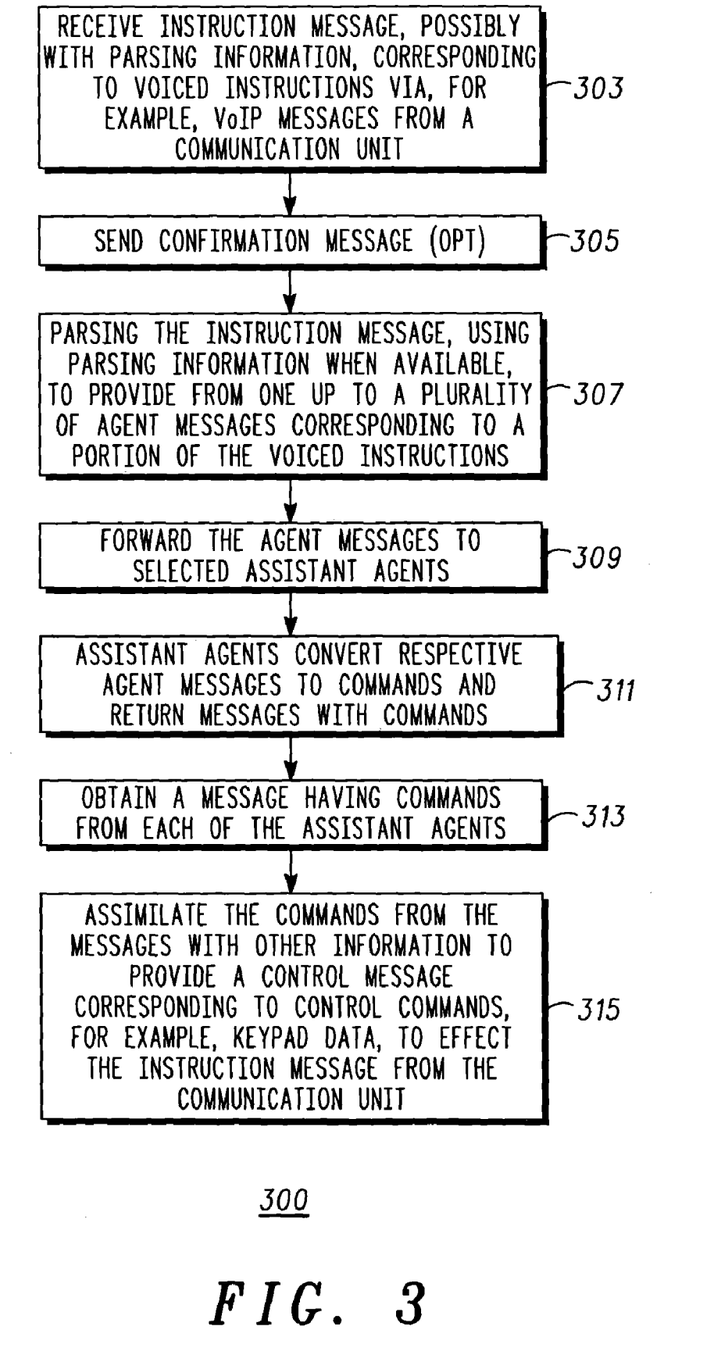
FIG. 3 depicts a flow chart of a preferred embodiment of a method of securely assisting with control of a communications unit.

Referring to FIG. 3, a flow chart of a preferred method 300 of one embodiment of a method of providing secure assistance with control of an electronic device or communications unit from a remote agent will be reviewed and discussed. Some of this discussion will be in the nature of a review and summary of portions of the discussions above. The server 200 of FIG. 2 can advantageously perform the method 300 although various other structures would also be suitable for performing the method 300. The method 300 begins at 303 where receiving an instruction message, possibly with parsing information, that corresponds to voiced instructions from a communications unit using for example, VoIP messages is shown. This can include receiving specific information sufficient to identify the communications unit and information for maintaining a database associated with the communications unit, the database including for example, unit specific information, a parameter status or a mirrored database associated with the communications unit. At 305, an optional process of sending a confirmation message to the communications unit indicating receipt of the instruction message is depicted.

Then, at 307 parsing the instruction message is performed, using or controlled by parsing information when available or one of the techniques noted above to provide one or more agent messages where the agent messages correspond to at least a portion of the voiced instructions and in one embodiment not more than a portion of the voiced instructions. Next, 309 operates to forward the agent messages to assistant agents that have been selected.

The process at 311 indicates that the assistant agents convert respective agent messages to commands and return messages with the commands. To do so the assistant agents may require access to a portion of the mirrored database however only a portion, such as names and locations in an index of a phone book, should be made available to the assistant agent in order to secure the contents of the mirrored database from the assistant agent. At 313 obtaining or receiving the messages from each of the assistant agents is undertaken. If the assistant agent has access to the portion of the phone book and the instruction message requires access to a number in the phone book, the message that is obtained will include a location or a name corresponding to the number and the assimilating the commands below with the other information will include retrieving the number. If the assistant agent does not have access to any portion of the phone book and the instruction message requires access to a number in a phone book included in the mirrored database, the message that is obtained will include a name as converted from an audible format to a digital format and the assimilating the commands with the other information, below, will include retrieving the number corresponding to the name.

At 315 assimilating the commands from the messages with other information to provide a control message corresponding to control commands, for example keypad data that correspond to the type of the communications unit is depicted. The control message is then sent to the communications unit to effect the instruction message. This control message is preferably sent using packet data processes and connections. The control commands, when executed by the communications unit, will effect an action corresponding to the voiced instructions, the action comprising one of; dialing a number, looking up a number in a phone book of the communications unit, the phone book incorporated into the mirrored database associated with the communications unit, modifying contents of a memory of the communications unit, sending a text message, etc.

The apparatus, processes, and systems discussed above and the inventive principles thereof are intended to offer a novel and advantageous methodology for providing secure assistance to a user of an electronic device or communications unit. Using these principles of receiving voiced instructions, parsing the voiced instructions and sending assistant agents only portions of the parsed instructions or allowing the assistant agents only limited access to sensitive data in a novel and inventive manner protects sensitive information and enhances security while still using public agents. The assistant agent can convert these instructions and return commands that can be assimilated into corresponding control commands specific to a communications unit from a remote secure agent for execution by that unit. This will facilitate a cost effective, efficient, and friendly means for securely assisting a user with tasks that are otherwise burdensome and hence often avoided, thus contributing to user satisfaction.

Furthermore the concepts and principles disclosed and discussed for controlling a device or unit by developing and sending control commands, such as keypad data corresponding to keypad activations will provide a secure means of controlling the device or unit since a remote agent or application will not be able to do anything that a user of the device could not do with the keyboard. It is expected that one of ordinary skill given the above described principles, concepts and examples will be able to implement other alternative procedures that are communications device dependent and that will also offer additional quick and efficient procedures for controlling or assisting a device or unit. It is anticipated that the claims below cover many such other examples.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of securely assisting with control of a communications unit from a remote agent, the method comprising:
   receiving an instruction message that corresponds to voiced instructions from the communications unit;
   parsing the instruction message to provide an agent message, the agent message corresponding to at least a portion of the voiced instructions;
   forwarding the agent message to an assistant agent;
   obtaining, responsive to the forwarding, a message having commands corresponding to and resulting from converting the at least a portion of the voiced instructions;
   assimilating the commands from the message with other information to provide a control message corresponding to control commands to effect the instruction message; and
   sending the control message to the communications unit, thereby securely assisting with the control of the communications unit.

2. The method of claim 1:
   wherein the receiving the instruction message further includes receiving specific information sufficient to identify the communications unit; and
   wherein the control message corresponds to control commands that correspond to a type of the communications unit.

3. The method of claim 2 wherein the voiced instructions are converted to the control commands that correspond to keypad activations at the communications unit.

4. The method of claim 2 further comprising maintaining a database associated with the communications unit, the database including one of a parameter status and a mirrored database associated with the communications unit.

5. The method of claim 4:
   wherein the control commands, when executed by the communications unit, will effect an action corresponding to the voiced instructions, the action comprising one of;
   dialing a number,
   looking up a number in a phone book of the communications unit, the phone book incorporated into the mirrored database associated with the communications unit,
   modifying contents of a memory of the communications unit, and
   sending a text message.

6. The method of claim 4 wherein only a portion of the mirrored database is available to the assistant agent thereby securing the contents of the mirrored database from the assistant agent.

7. The method of claim 6 wherein the mirrored database comprises a phone book associated with the communications unit and the portion comprises only names and corresponding locations within the phone book.

8. The method of claim 7 wherein when the instruction message requires access to a number in the phone book, the message that is obtained will include one of a location and a name corresponding to the number and the assimilating the commands with the other information comprises retrieving the number.

9. The method of claim 4 wherein when the instruction message requires access to a number in a phone book included in the mirrored database, the message that is obtained comprises a name and the assimilating the commands with the other information comprises retrieving the number corresponding to the name.

10. The method of claim 1 wherein the parsing further comprises parsing the instruction message to provide a first agent message and a second agent message each of the first and second agent message being, respectively, no more than a first and a second portion of the voiced instructions.

11. The method of claim 10 wherein the parsing the instruction message to provide a first agent message and a second agent message is controlled according to parsing information included with the instruction message.

12. The method of claim 1 wherein:
   the parsing the instruction message provides a plurality of agent messages;

the forwarding further comprises forwarding the plurality of agent messages to a plurality of assistant agents without any one of the plurality of assistant agents getting all of the plurality of agent messages;

the obtaining further comprises obtaining a plurality of messages with one message from each of the plurality of assistant agents; and the assimilating the commands from the message with other information further comprises assimilating commands from each of the messages to provide the control message.

13. A secure server arranged and constructed to assist with control of a communications unit, the server comprising:

a receiver to receive an instruction message that corresponds to voiced instructions from the communications unit;

a controller, coupled to the receiver, to parse the instruction message to provide an agent message, the agent message corresponding to at least a portion of the voiced instructions; and a transmitter, coupled to and controlled by the controller, to forward the agent message to an assistant agent; wherein:

the receiver further obtains, responsive to the forwarding, a message having commands corresponding to and resulting from converting the at least a portion of the voiced instructions;

the controller assimilates the commands from the message with other information to provide a control message corresponding to control commands to effect the instruction message; and the transmitter sends the control message to the communications unit, thereby securely assisting with the control of the communications unit.

14. The secure server of claim 13:

wherein the receiver further receives specific information sufficient to identify the communications unit; and wherein the controller provides the control message corresponding to control commands that correspond to a type of the communications unit.

15. The secure server of claim 14 further comprising a memory coupled to the controller for storing a database associated with the communications unit, the database including one of unit specific information, a parameter status and a mirrored database associated with the communications unit.

16. The secure server of claim 15 wherein only a portion of the mirrored database stored in the memory is available to the assistant agent thereby securing the contents of the mirrored database from the assistant agent.

17. The secure server of claim 16 wherein the mirrored database stored in the memory comprises a phone book associated with the communications unit and the portion comprises only names and corresponding locations within the phone book.

18. The secure server of claim 17 wherein when the instruction message requires access to a number in the phone book stored in the memory, the message that is obtained will include one of a location and a name corresponding to the number and the controller assimilates the commands with the other information and further retrieves the number.

19. The secure server of claim 15 wherein when the instruction message requires access to a number in a phone book included in the mirrored database, the message that is obtained comprises a name and the controller assimilates the commands with the other information and further retrieves the number corresponding to the name.

20. The secure server of claim 13 wherein the controller to parse the instruction message is further for parsing the instruction message to provide a first agent message and a second agent message each of the first and second agent message being, respectively, no more than a first and a second portion of the voiced instructions.

21. The secure server of claim 20 wherein the controller for parsing the instruction message to provide a first agent message and a second agent message use parsing information included with the instruction message.

22. The secure server of claim 13 wherein:

the controller to parse the instruction message further provides a plurality of agent messages, each indexed to the instruction message;

the transmitter is used to forward the plurality of agent messages to a plurality of assistant agents without any one of the plurality of assistant agents getting all of the plurality of agent messages;

the receiver is used to obtain a plurality of the messages with each one of the messages from a corresponding one of the plurality of assistant agents; and the controller assimilates the commands from the plurality of messages to provide the control message.

23. A system in a secure server for assisting with control of a communications unit, the system comprising:

a controller; and a software program that when loaded and executing on the controller results in the controller;

parsing an instruction message corresponding to voiced instructions from the communications unit to provide an agent message for an assistant agent, the agent message corresponding to at least a portion of the voiced instructions; and obtaining, responsive to the agent message, a message having commands corresponding to and resulting from converting the at least a portion of the voiced instructions; and assimilating the commands from the message with other information to provide a control message corresponding to control commands to effect the instruction message at the communications unit, thereby securely assisting with the control of the communications unit.

24. The system of claim 23, further comprising maintaining a database associated with the communications unit, the database including one of unit specific information, a parameter status and a mirrored database associated with the communications unit.

25. The system of claim 24 wherein the mirrored database comprises a phone book associated with the communications unit and only a portion of the phone book is available to the assistant agent, the portion comprising names and corresponding locations within the phone book.

26. The system of claim 25 wherein when the instruction message requires access to a number in the phone book stored in the memory, the message that is obtained responsive to the agent message includes one of a location and a name corresponding to the number and the assimilating the commands from the message with the other information further comprises retrieving the number corresponding to the one of the location and the name.

27. The system of claim 24 wherein when the instruction message requires access to a number in a phone book included in the mirrored database, the message that is obtained comprises a name and the assimilating the commands with the other information further comprises retrieving the number corresponding to the name.

28. The system of claim 23 wherein the parsing the instruction message is further for parsing the instruction message to provide a first agent message and a second agent message each of the first agent message and the second agent message being, respectively, no more than a first and a second portion of the voiced instructions.

29. The system of claim 28 wherein the parsing the instruction message to provide a first agent message and a second agent message uses parsing information included with the instruction message.

30. The system of claim 23 wherein:
the parsing the instruction message further provides a plurality of agent messages for a plurality of assistant agents without any one of the plurality of assistant agents getting all of the plurality of agent messages, each agent message indexed to the instruction message;
the obtaining comprises obtaining a plurality of the messages with each one of the messages from a corresponding one of the plurality of assistant agents; and
the assimilating for comprises assimilating the commands from the plurality of messages to provide the control message.

31. A method of securely providing a control message for a communications unit, the method comprising:
parsing voiced instructions to provide a plurality of agent messages, the agent messages corresponding to at least a portion of the voiced instructions;
forwarding the plurality of agent messages to a plurality of assistant agents; each of the assistant agents converting a corresponding one of the plurality of the agent messages to commands; and
assimilating the commands resulting from the converting to provide the control message corresponding to the voiced instructions.

* * * * *